(12) United States Patent
Ridjic

(10) Patent No.: US 11,691,549 B2
(45) Date of Patent: Jul. 4, 2023

(54) PROCESS FOR THE DECORATION OF A FURNITURE COMPONENT FOR RECREATIONAL VEHICLES AND THE LIKE AND COMPONENT THUS OBTAINABLE

(71) Applicant: TECNOFORM S.P.A., Valsamoggia-Frazione Crespellano (IT)

(72) Inventor: Tomislav Ridjic, Valsamoggia-Frazione Crespellano (IT)

(73) Assignee: Tecnoform S.p.a., Frazione Crespellano (IT)

( * ) Notice: Subject to any disclaimer, the term of this patent is extended or adjusted under 35 U.S.C. 154(b) by 418 days.

(21) Appl. No.: 16/642,005

(22) PCT Filed: Aug. 23, 2018

(86) PCT No.: PCT/IB2018/056385
§ 371 (c)(1),
(2) Date: Feb. 25, 2020

(87) PCT Pub. No.: WO2019/038707
PCT Pub. Date: Feb. 28, 2019

(65) Prior Publication Data
US 2020/0207244 A1    Jul. 2, 2020

(30) Foreign Application Priority Data

Aug. 25, 2017 (IT) .................. 102017000096330

(51) Int. Cl.
*B60N 2/58* (2006.01)
*B60R 13/02* (2006.01)

(52) U.S. Cl.
CPC ........ *B60N 2/5875* (2013.01); *B60R 13/0243* (2013.01)

(58) Field of Classification Search
CPC .. B44C 3/08; B44C 3/02; B44C 1/105; B60R 13/04
See application file for complete search history.

(56) References Cited

U.S. PATENT DOCUMENTS

| | | |
|---|---|---|
| 3,322,610 A | 5/1967 | Brooks et al. |
| 3,881,042 A | 4/1975 | Ungerer |
| 4,446,179 A * | 5/1984 | Waugh ...................... B32B 3/20 52/716.5 |
| 4,737,225 A * | 4/1988 | Waugh ..................... B41M 1/30 156/247 |
| 4,748,062 A | 5/1988 | Menjo et al. |

(Continued)

FOREIGN PATENT DOCUMENTS

| | | |
|---|---|---|
| DE | 102006021190 A1 | 11/2007 |
| FR | 2402793 A1 | 4/1979 |

*Primary Examiner* — Sarah B McPartlin
(74) *Attorney, Agent, or Firm* — David B. Tingey; Bryant J. Keller; Kirton McConkie

(57) ABSTRACT

The process for the decoration of a furniture component for recreational vehicles and the like comprises an application step of a decorative portion which is preformed onto a semi-finished structure provided with a surface and with at least a perimeter edge, with the decorative portion that comprises at least a visible portion and at least an adhesion portion adapted to be coupled to the semi-finished structure.

13 Claims, 3 Drawing Sheets

(56) References Cited

U.S. PATENT DOCUMENTS

| | | | | |
|---|---|---|---|---|
| 7,897,233 B2* | 3/2011 | Esposito | ............... | A63C 5/003 |
| | | | | 428/137 |
| 2006/0187655 A1* | 8/2006 | Bryerman | ............... | F21V 33/00 |
| | | | | 362/154 |
| 2015/0094153 A1* | 4/2015 | Silverglate | ............ | A63H 17/38 |
| | | | | 463/43 |

* cited by examiner

PROCESS FOR THE DECORATION OF A FURNITURE COMPONENT FOR RECREATIONAL VEHICLES AND THE LIKE AND COMPONENT THUS OBTAINABLE

TECHNICAL FIELD

The present invention relates to a process for the decoration of a furniture component for recreational vehicles and the like and component thus obtainable.

BACKGROUND ART

On the market of recreational vehicles and the like, such as boats and other types of motorized and non-powered vehicles, the aesthetic appearance and design of the interior play a very important role in satisfying the aesthetic tastes of users.

In this context, the interior design includes decorated components, planned and designed not only to offer maximum functionality, but also to provide buyers with solutions with an appealing design and with pleasant aesthetic lines.

The need is therefore known to make decorated furniture components which are able to satisfy the aesthetic and design tastes of the users.

Also known is the need of manufacturers to optimize production processes in order to lower production costs so as to be more competitive.

The decoration of the furniture component, in fact, implies the inclusion in the component manufacturing process of further steps designed to achieve the desired decoration.

A first known manufacturing process involves making a surface coating to be applied on the surface of the component and a subsequent application of decorative strips which are adapted to make a decorative portion.

For example, a process of this type provides for the application of a surface coating on the basic structure of the component.

The surface coating is obtained by gluing a first portion of coating, a second portion of coating and a third portion of coating, placed adjacent to each other. After the coating has been applied, milling is carried out at the junction lines.

In the cuts, decorative strips are then inserted and glued, e.g., in metal, useful for giving aesthetic appeal and distinctive character to the component.

Milling is necessary to ensure that the decorative strips do not overhang with respect to the surrounding surface.

One drawback of this first known process is the high number of manufacturing steps necessary to obtain a complete decoration, i.e., gluing portions of coating, application of coating on component surface, milling for each decorative strip to be applied and application of each decorative strip.

The realization of these steps involves material and energy consumption, time and labor, resulting in higher component production costs.

A second known manufacturing process involves a decoration step wherein decorative strips are applied directly to the rough component, e.g., by gluing.

One drawback of this second known process is that each decorative strip is applied individually.

The above process, therefore, is inconvenient and expensive when the application of a multiplicity of decorative strips is required.

DESCRIPTION OF THE INVENTION

The main aim of the present invention is to provide a process for the decoration of a furniture component for recreational vehicles and the like which is able to reduce the number of manufacturing steps needed to decorate the component.

One object of the present invention is to provide a process for the decoration of a furniture component for recreational vehicles and the like which can be easily realized within the manufacturing process of a component.

Another object of the present invention is to provide a furniture component for recreational vehicles and the like obtainable from the above-described process which has a pleasant aesthetic appearance and a reduced cost.

Another object of the present invention is to provide a process for the decoration of a furniture component for recreational vehicles and the like and component thus obtainable which allow overcoming the mentioned drawbacks of the prior art within the scope of a simple, rational, easy, efficient to use and cost-effective solution.

The aforementioned objects are achieved by the present process for the decoration of a furniture component for recreational vehicles and the like having the characteristics set forth in the claims and by the furniture component having the characteristics set forth in the claims.

BRIEF DESCRIPTION OF THE DRAWINGS

Other characteristics and advantages of the present invention will become more evident from the description of a preferred, but not exclusive embodiment of a process for the decoration of a furniture component for recreational vehicles and the like, illustrated by way of an indicative, but non-limiting example, in the attached drawings in which.

EMBODIMENTS OF THE INVENTION

Figure 1:
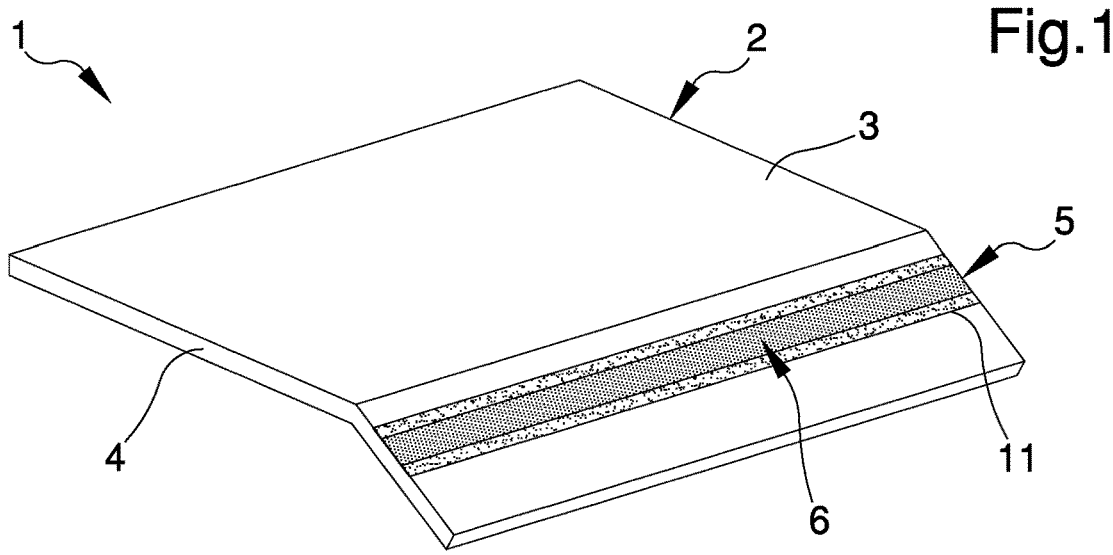
FIG. 1 is an axonometric view of a first embodiment of the furniture component according to the invention.

With particular reference to these figures, reference numeral 1 globally indicates a furniture component for recreational vehicles and the like comprising at least a semi-finished structure 2 provided with a surface 3 and with at least a perimeter edge 4.

In the present embodiments, the component 1 is of the leaf type, but similar solutions cannot be ruled out wherein the component 1 is a similar element, such as a door or a projecting piece.

The semi-finished structure 2 is a leaf provided with its structural component, but not yet provided with finishes and decorations.

In a first embodiment (FIGS. 1 to 4) the component 1 comprises at least a pre-formed decorative portion 5 provided with at least a visible portion 6 and at least an adhesion portion 7, the latter being coupled to the semi-finished structure 2.

In particular, the decorative portion 5 is a semi-finished product applied to the surface of the semi-finished structure 2.

As shown in the illustrations, the visible portion 6 comprises at least a first decorative strip 8 and at least a second decorative strip 9 which are coupled and adjacent the one with respect to the other.

In the present embodiment, the visible portion 6 is defined by a first decorative strip 8 adjacent to a second decorative strip 9 in turn adjacent to another first decorative strip 8.

Usefully, the first decorative strip 8 is of the type of a laminate with metallic optical effect, made with reflective material adapted to induce a metallic optical effect, while the second decorative strip 9 is of the type of a laminate with woody optical effect, distinguishable from the woody optical effect associated with the surface 3.

Combinations of materials with different optical effects cannot be ruled out, e.g., colored decorative strips or covered with patterns of various types, just as the use cannot be ruled out of a different number of first decorative strips 8 and/or second decorative strips 9, or the use of other decorative strips in addition to the first strip 8 and the second strip 9.

Advantageously, the adhesion portion 7 is the type of a double-sided adhesive strip.

Figure 3:
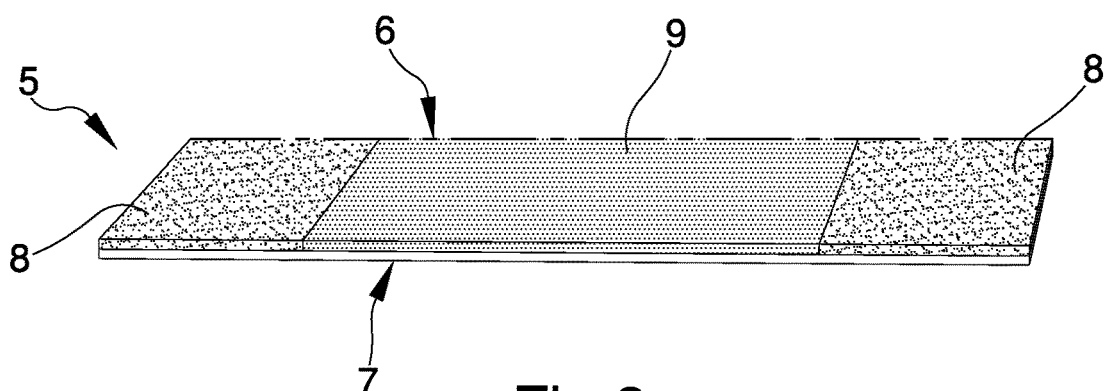

As shown in FIG. 3, the bi-adhesive strip 7 is placed on the lower surface of the decorative portion 5, i.e. the surface of the decorative portion 5, intended to come into contact with the semi-finished structure 2.

The technical effect is to retain the decorative portion onto the semi-finished structure 2.

In this first embodiment, the surface 3 of the semi-finished structure 2 comprises a decoration seat 10 in which the decorative portion 5 is inserted.

This way the decorative portion 5 appears to be an integral part of the component 1.

In particular, the decorative portion 5 is inserted to measure in the decoration seat 10, giving the component 1 a continuous profile, pleasing both aesthetically and to the touch.

Figure 2:
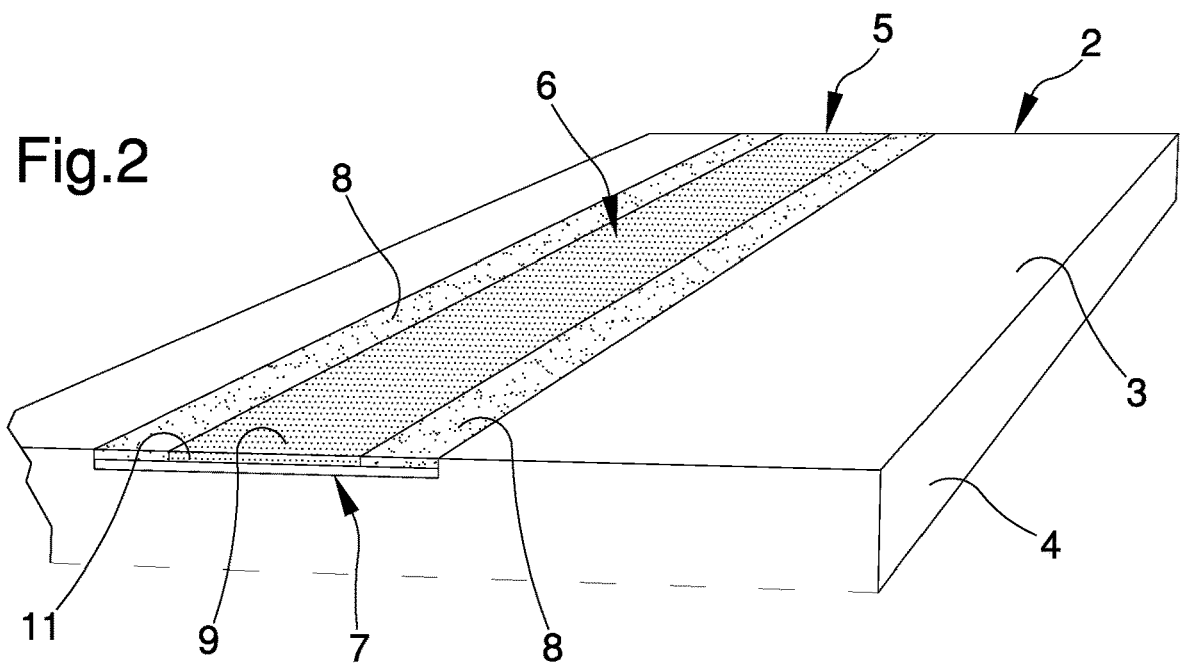
FIGS. 2 and 3 are axonometric views of details of the furniture component according to the invention.

As shown in FIGS. 1 and 2, the decoration seat 10 is obtained for the entire length of the surface 3, but different solutions cannot be ruled out, wherein the decoration seat 10 is only made for limited lengths and in different areas than those shown.

With reference to the first embodiment shown in FIGS. 1 to 4, according to the invention, the process for the decoration of a furniture component for recreational vehicles and the like comprises an application step A of a pre-formed decorative portion, indicated with reference numeral 5, onto a semi-finished structure 2, the latter being provided with a surface 3 and with at least a perimeter edge 4.

As illustrated, the decorative portion 5 comprises at least a visible portion 6 and at least an adhesion portion 7 adapted to be coupled to the semi-finished structure 2.

In particular, the application step A comprises a removal step R for removing a protective coating 11 adapted to preserve an adhesion portion of the decorative portion 5.

The adhesion portion 7 is formed by a double-sided adhesive layer associated on one side with the visible portion 6 of the decorative portion 5.

The application step A also comprises a coupling step C for coupling the adhesion portion 7 to the semi-finished structure 2 to bond the decorative portion 5 onto the surface 3.

Advantageously, the process comprises a milling step F of the surface 3 for making a decoration seat 10 adapted to engage the decorative portion 5 in the coupling step C.

Figure 4:
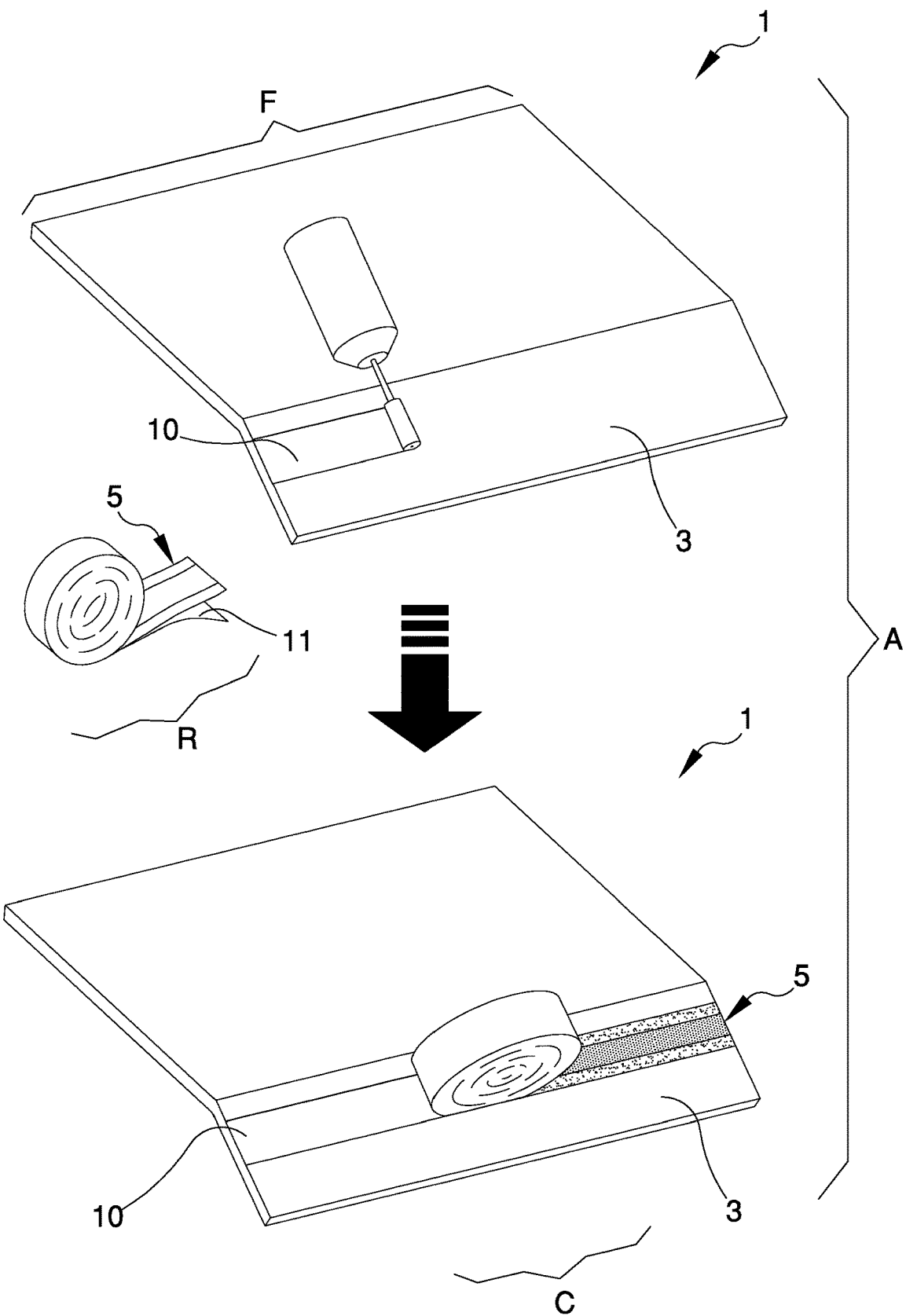
FIG. 4 is a schematic view of a first embodiment of the process according to the invention.

The milling step F, schematically illustrated in FIG. 4, provides for the realization of the decoration seat 10 in such a way as to be able to insert and bond the pre-formed decorative portion 5.

This way, the adhesion capacity of the decorative portion 5 is improved, since the decoration seat 10 helps to fix the decoration portion together with the adhesive action of the adhesion portion 7.

The process further comprises a preliminary step of making the decorative portion 5, for simplicity not shown in the figures.

The preliminary step comprises an assembly operation on the adhesion portion 7 of the first decorative strips 8 and of the second decorative strip 9 adjacent to each other so as to form the visible portion 6, and make therefore the decorative portion 5.

Figure 5:
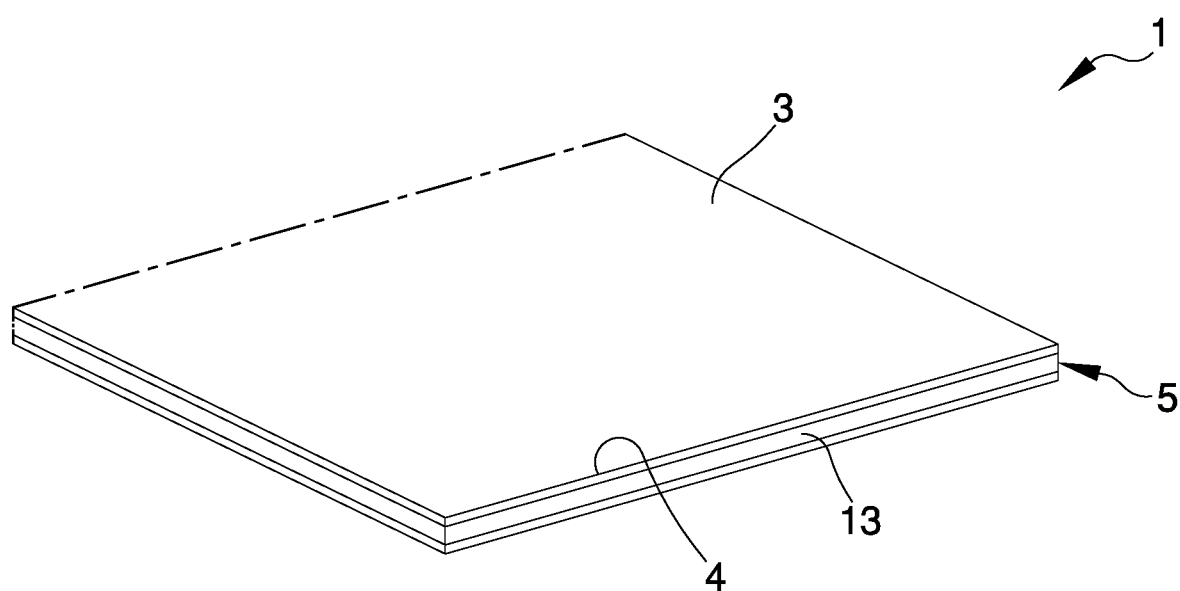
FIG. 5 is an axonometric view of a second embodiment of the furniture component according to the invention.
Figure 6:
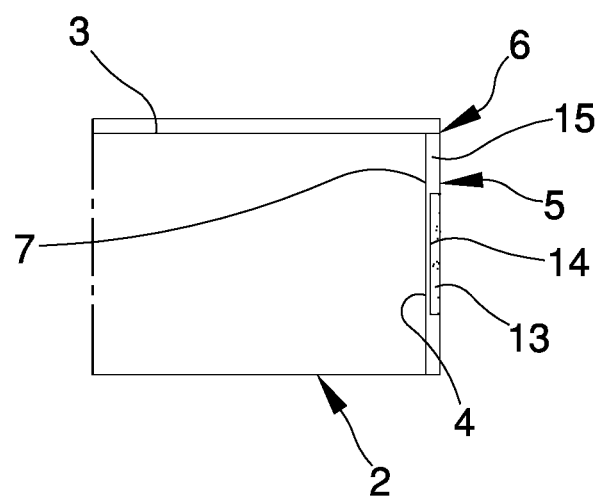
FIG. 6 is a view of a detail of a second embodiment of the component according to the invention.

In a second embodiment, shown in FIGS. 5 and 6, the furniture component 1 is completely similar to that described in the first embodiment and differs inasmuch as the decorative portion 5 is coupled to at least one section of the perimeter edge 4.

In the embodiment shown, the decorative portion 5 is applied at the perimeter edge 4, which extends along the entire perimeter of the semi-finished structure 2, but alternative solutions cannot be ruled out which provide for the coating of only a limited portion of the perimeter edge 4.

The decorative portion 5 is pre-formed and comprises a second decoration seat 14 and at least a central decorative strip 13.

Conveniently, the central decorative strip 13 is of the type of a metal insert, or the like.

Solutions that provide for multiple decorative strips with different optical effects, e.g. woody or plastic inserts, cannot be ruled out.

The process for the decoration of a furniture component for recreational vehicles in this second embodiment is completely similar to the process described for the first embodiment and is differentiated by the fact that it comprises a preliminary step of making the decorative portion 5 comprising a milling operation of a decorative medium 15.

The milling operation allows obtaining at least one decorative base strip and a second decoration seat 14.

The preliminary step also comprises an application of a central decorative strip 13 in the second decoration seat 14 to form the decorative portion 5.

The pre-formed decorative portion 5, thus made, is particularly adapted to be applied onto the perimeter edge 4 of the component.

This way it is possible to apply a pre-formed decorative portion 5 also on the perimeter edges of leaves or other furniture components for recreational vehicles and the like.

In this second embodiment, the decorative portion 5 is applied onto the perimeter edge 4 by means of gluing techniques known from the prior art.

Different embodiments cannot be ruled out which provide for a combination of the two previously described embodiments, e.g. having decorative portions 5 both on the surface 3 and on the perimeter edge 4.

Also embodiments cannot be ruled out wherein the decorative portion 5 described in the second embodiment is applied onto the surface 3 of the component.

It has in practice been ascertained that the described invention achieves the intended objects, and in particular the fact is underlined that the process for the decoration of a furniture component for recreational vehicles and the like makes it possible to reduce the number of manufacturing steps needed for the decoration of the component.

The use of a pre-formed decorative portion in fact permits eliminating the multiple milling and gluing steps required to apply multiple decorative strips.

The adhesion portion also makes it possible to avoid gluing operations which involve the preparation of a gluing substance and a separate application of the substance itself, thus reducing the time required to produce the component.

Moreover, the devised process can easily be carried out within the production process of a component, since no specific machinery is required different to that normally used in known methods.

The furniture component for recreational vehicles and the like obtainable using the above-described process has a pleasant aesthetic appearance thanks to the pre-assembled decoration seat and decorative strips.

Furthermore, the component made this way will be inexpensive thanks to the reduction in the manufacturing steps needed for its production.

The invention claimed is:

1. A process for decorating a furniture component for a recreational vehicle, wherein the process comprises:
    milling a decoration seat into a surface of a semi-finished structure of the furniture component for the recreational vehicle, wherein the semi-finished structure is provided with the surface and with at least a perimeter edge; and
    applying into the decoration seat a pre-formed decorative portion that comprises at least a visible portion and at least an adhesion portion such that an external face of the visible portion runs flush with the surface of the semi-finished structure of the furniture component.

2. The process according to claim 1, wherein the applying of the pre-formed decorative portion into the decoration seat comprises:
    removing a protective coating adapted to preserve said adhesion portion of said pre-formed decorative portion; and
    coupling said adhesion portion to said semi-finished structure of the furniture component to bond said pre-formed decorative portion onto said surface.

3. The process according to claim 1, wherein the process further comprises making said pre-formed decorative portion by performing an assembly operation on said adhesion portion of at least a first decorative strip and at least a second decorative strip adjacent to each other to form said visible portion.

4. The process according to claim 1, wherein the process further comprises:
    making said pre-formed decorative portion by performing a milling operation of a decorative medium to obtain at least a decorative base strip and a second decoration seat; and
    applying a central decorative strip in said second decoration seat to form said pre-formed decorative portion.

5. The process according to claim 1, wherein the furniture component comprises at least one of (i) a door, (ii) a cabinet door, and (iii) a shelf of the recreational vehicle.

6. A furniture component for a recreational vehicle, the furniture component comprising:
    at least a semi-finished structure of the furniture component provided with a surface and at least a perimeter edge, wherein the semi-finished structure of the furniture component comprises at least a pre-formed decorative portion provided with at least a visible portion and at least an adhesion portion coupled to said semi-finished structure, and wherein said surface comprises a decoration seat in which said pre-formed decorative portion is inserted such that an external surface of the pre-formed decorative portion and said surface have a continuous profile.

7. The furniture component according to claim 6, wherein said visible portion comprises at least a first decorative strip and at least a second decorative strip which are coupled and adjacent with each other.

8. The furniture component according to claim 6, wherein said adhesion portion is a type of a double-sided adhesive strip.

9. The furniture component according to claim 6, wherein said pre-formed decorative portion is disposed at and coupled to at least a section of said perimeter edge of said semi-finished structure of the furniture component.

10. The furniture component according to claim 9, wherein said pre-formed decorative portion comprises a second decoration seat and at least a central decorative strip.

11. The furniture component according to claim 6, wherein the furniture component comprises at least one of (i) a door, (ii) a cabinet door, and (iii) a shelf of the recreational vehicle.

12. A process for decorating a furniture component for use within a recreational vehicle, wherein the process comprises:
    applying a decorative portion which is preformed onto a semi-finished structure of the furniture component provided with a surface and with at least a perimeter edge, said decorative portion comprising at least a visible portion and at least an adhesion portion adapted to be coupled to the semi-finished structure; and
    milling said surface to make a decoration seat adapted to engage said decorative portion as part of the applying the decorative portion onto the semi-finished structure of the furniture component, wherein said applying the decorative portion comprises:
    removing a protective coating adapted to preserve said adhesion portion of said decorative portion; and
    coupling said adhesion portion to said semi-finished structure of the furniture component to bond said decorative portion onto said surface such that an external face of the visible portion runs flush with the surface of the semi-finished structure of the furniture component.

13. The process according to claim 12, wherein the furniture component comprises at least one of (i) a door, (ii) a cabinet door, and (iii) a shelf of the recreational vehicle.

* * * * *